B. B. & J. R. Hill,
Corn Popper.

No. 92,967. Patented July 27, 1869.

Witnesses
J. Gutmate
A. Greene

Benj. B. Hill
John R. Hill

United States Patent Office.

BENJAMIN B. HILL AND JOHN R. HILL, OF WORCESTER, MASSACHUSETTS.

Letters Patent No. 92,967, dated July 27, 1869.

CORN-POPPER.

The Schedule referred to in these Letters Patent and making part of the same.

*To whom it may concern:*

Be it known that we, BENJAMIN B. HILL and JOHN R. HILL, both of the city and county of Worcester, State of Massachusetts, have invented certain new and useful Improvements in Corn-Poppers; and we do hereby declare that the following is a full, clear, and exact description of the same, due reference being had to the accompanying drawings, in which—

Figure 1:
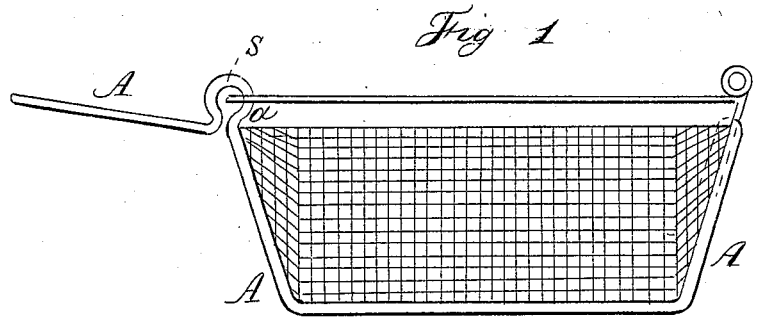
Figure 1 shows a side view of our improved popper.
Figure 2:
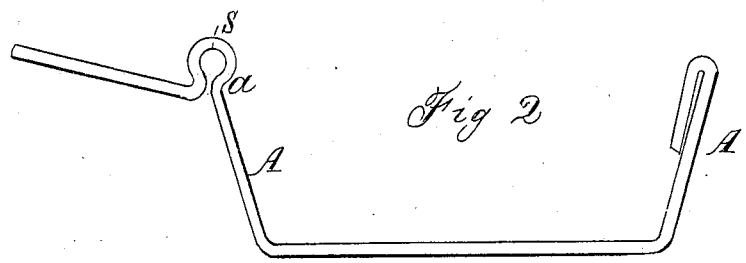
Figure 2 shows the form of the wire forming the guard, hinge, and handle.

Our invention applies to the form of poppers shown, which are usually made of wire cloth; and consists in carrying the wire A, which forms the guard on the bottom, up and through the binding, at *a*, and there forming a loop or eye, S, making a hinge for the top or cover, and then giving it such form as to attach to a handle, as, when two of them are used, they can be brought together, and driven into a wooden handle.

We are aware that guards or strengthening-wires underneath are not new, and also that wires from the handle, with eyes or loops, to form the hinge for the cover, are not new. These we do not claim; but

What we claim as new, and desire to secure by Letters Patent, is—

Forming the guard, the eye or loop S, making the hinge for the cover, and the handle or tang, of one and the same continuous piece of wire, when constructed and operating in the manner and for the purposes above set forth and described.

BENJ. B. HILL.
JOHN R. HILL.

Witnesses:
JAMES G. ARNALL,
A. GREENE.